H. MARMON.
WIND SHIELD.
APPLICATION FILED JULY 13, 1914.
1,146,007.
Patented July 13, 1915.
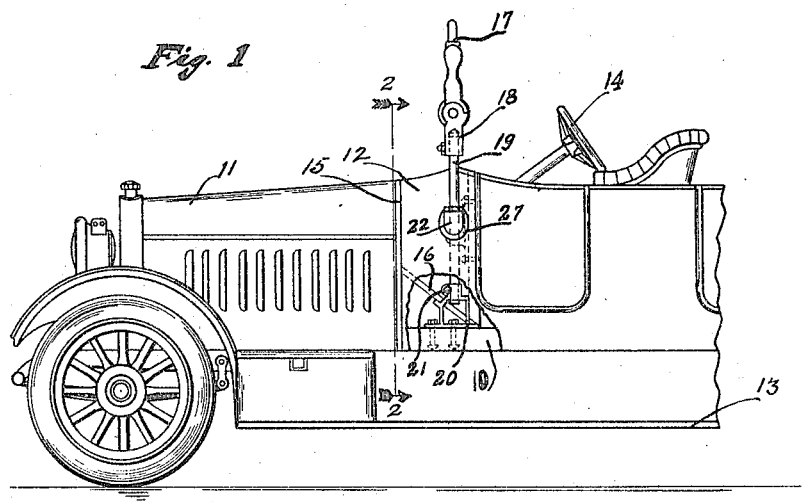
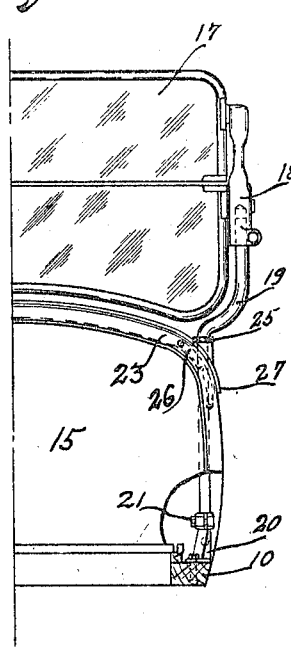
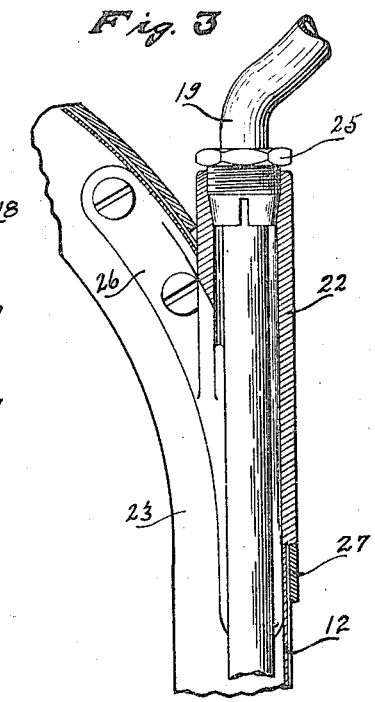
WITNESSES:
Yost Braddock
Josephine Gasper
INVENTOR
HOWARD MARMON
BY
Hood & Schley
ATTORNEYS

UNITED STATES PATENT OFFICE.

HOWARD MARMON, OF INDIANAPOLIS, INDIANA.

WIND-SHIELD.

1,146,007.     Specification of Letters Patent.     Patented July 13, 1915.

Application filed July 13, 1914. Serial No. 850,820.

*To all whom it may concern:*

Be it known that I, HOWARD MARMON, a citizen of the United States, residing at Indianapolis, in the county of Marion and State of Indiana, have invented a new and useful Wind-Shield, of which the following is a specification.

It is the object of my invention to provide an automobile wind shield which is graceful in appearance and strong in construction, and which does not require any bracing straps or rods to reinforce it.

In attaining this object I provide for the wind shield supporting parts which are anchored in the automobile frame work, preferably the sill, and each of which is preferably attached to said frame work at two spaced points thereon, these two points being conveniently substantially one above the other, one on the sill and the other on the cowl frame, the posts passing through the cowl and their lower ends being hidden.

The accompanying drawing illustrates my invention.

Figure 1 is a partial side view of an automobile equipped with my improved wind shield; Fig. 2 is an enlarged half section on the line 2—2 of Fig. 1; and Fig. 3 shows a detail of one of the fittings by which the wind shield supports are mounted on the automobile.

The automobile shown has the usual sills 10, engine hood 11, cowl 12, running boards 13, steering wheel 14, dash 15, and toe board 16. The wind shield 17, of any desired form, is suitably mounted in two side members 18, which have sockets fitting over and clamped on the upper ends of two supporting posts 19. These supporting posts 19 have their ends anchored firmly in the automobile frame. In the arrangement shown, this is done by having these lower ends mounted in fittings 20 bolted to the sills 10, these fittings 20 being split and having clamping screws 21 for clamping the lower ends of the posts 19 in place. The fittings 20 are preferably under the cowl 12, and the posts 19 pass through the cowl so that their lower ends are hidden. At the points where they thus pass through the cowl, the posts 19 are mounted in fittings 22 firmly attached to the frame 23 of the cowl. This provides a second point of support for each of the posts, so that the latter are firmly held in place without the use of any reinforcing rods or straps. The fittings 22 are preferably in the form of bushing tubes through which the posts 19 pass, the upper ends of such tubes being internally screw-threaded and tapered to receive split, tapered, tubular clamping screws 25 which when clamped in place firmly grip the posts. The fittings 22 have flanges 26 under the cowl for receiving the screws or bolts which fasten the fittings to the cowl frame. If desired, a strap 27, provided with holes for the fittings 23 may extend over the cowl from one of such fittings to the other.

I claim as my invention:

1. In combination, an automobile frame, a cowl mounted thereon, a wind shield, and supporting posts for said wind shields, said posts extending through the cowl and having their lower ends attached to the automobile frame under the cowl.

2. In combination, an automobile frame having a sill, a cowl frame mounted on said automobile frame, a wind shield, supporting posts for said wind shield, and fittings on said automobile frame and cowl frame for holding said posts, the fittings on the cowl frame being in the form of bushings surrounding the posts and provided with split clamping screws which when tightened grip the posts.

3. In combination, an automobile frame having a sill, a cowl frame mounted on said automobile frame, a wind shield, supporting posts for said wind shield, and fittings on said automobile frame and cowl frame for holding said posts, the fittings on the cowl frame being in the form of bushings surrounding the posts.

In witness whereof, I, have hereunto set my hand at Indianapolis, Indiana, this 10th day of July, A. D. one thousand nine hundred and fourteen.

HOWARD MARMON.

Witnesses:
    FRANK A. FAHLE,
    AUTHUR M. HOOD.